C. HOLLY.
METHOD OF MAKING BOXES.
APPLICATION FILED FEB. 25, 1911.

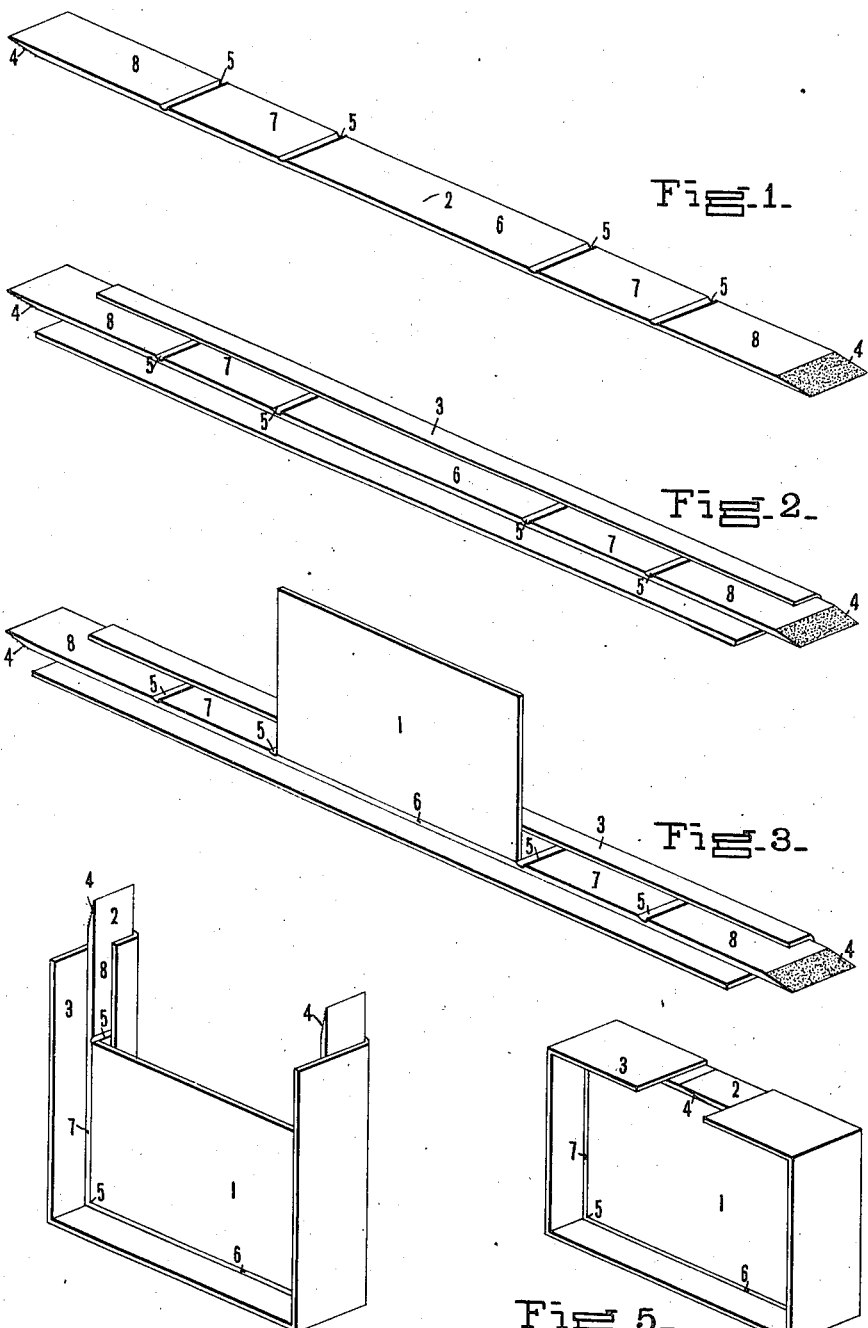

1,041,285.

Patented Oct. 15, 1912.
2 SHEETS—SHEET 2.

UNITED STATES PATENT OFFICE.

CARLOS HOLLY, OF LOCKPORT, NEW YORK, ASSIGNOR TO THE F. N. BURT COMPANY, LIMITED, OF BUFFALO, NEW YORK, A CORPORATION OF ONTARIO, CANADA.

METHOD OF MAKING BOXES.

1,041,285.    Specification of Letters Patent.    Patented Oct. 15, 1912.

Original application filed April 24, 1909, Serial No. 492,029. Divided and this application filed February 25, 1911. Serial No 610,763.

*To all whom it may concern:*

Be it known that I, CARLOS HOLLY, a citizen of the United States, residing at Lockport, in the county of Niagara and State of New York, have invented certain new and useful Improvements in Methods of Making Boxes, of which the following is a full, clear, and exact description, such as will enable others skilled in the art to which it appertains to make and use the same.

This invention relates to methods of making boxes and parts of boxes, and especially to methods employed in the formation of paper articles and boxes.

One of the objects of this invention is the production of a method whereby a box of simple construction may be made rapidly and inexpensively.

Another object of the invention is the production of a method of producing a covered box in which the corners shall be square and sharp, and present a finished appearance both on the inside and the outside of the box.

Another object of the invention is a method resulting in the production of certain elements of a box which may be accurately and easily assembled.

Another object of the invention is the production of a method of making boxes of the above character, which is cheaper and more expeditious than methods heretofore employed and whereby the joints of said box may be efficiently secured and present a finished appearance.

The invention accordingly consists in the several steps and the relation and order of one or more of such steps with relation to each of the others thereof, which will be exemplified in the method hereinafter disclosed and the scope of the application of which will be indicated in the following claims.

The subject matter of this application is disclosed in my prior application, Serial No. 492,029, filed April 24, 1909, entitled Method of and machine for making boxes, and this case is a division of said former application.

Figure 6:
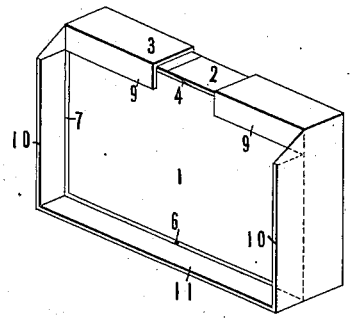
Figure 7:
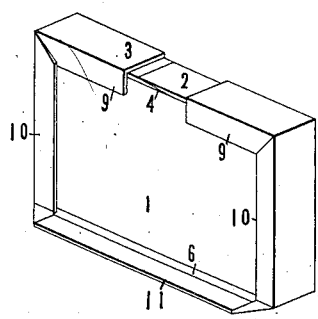
Figure 8:
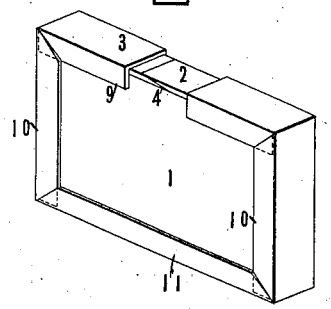
Figure 9:
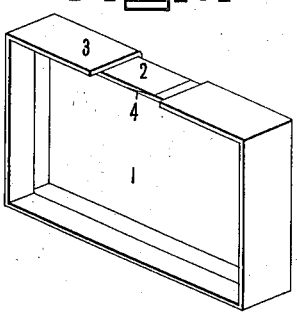
Figure 10:
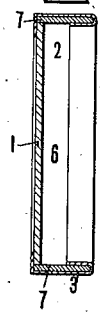
Figure 11:
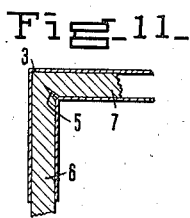

In the accompanying drawing, wherein similar reference characters refer to similar parts throughout the several views, Figure 1 is a perspective view of the box flange, in blank form; Fig. 2 is a perspective view of the flange with the binder connected thereto, also in blank form; Fig. 3 is a perspective view showing the head in position on the combined blank; Fig. 4 is a perspective view of the combined blank bent part way around the head; Fig. 5 is a perspective view of the combined blank bent completely around the head; Fig. 6 is a perspective view showing the combined blank bent around the head, with one edge of the binder turned down and pasted against the outside of the head; Fig. 7 is a view similar to Fig. 6, showing three sides of the binder folded down and pasted to the outside of the head; Fig. 8 is a perspective view of the completed box from the outside; Fig. 9 is a perspective view of the completed box from the inside; Fig. 10 is a view of the box in transverse section; Fig. 11 is a sectional view of a corner of the box.

The box produced by practicing the improved method is preferably a rectangular box, having a head or body 1, a marginal flange 2, which extend around the edge of the head, and a binder or covering 3 connecting the head and flange. These parts are preferably made of paper of suitable thickness, but if desired other materials may be used.

The marginal flange is produced from a flange strip or blank of rectangular outline (Fig. 1) to conform with the shape of the box when the parts are in assembled position. The ends 4 of the flange are beveled or scarfed on opposite sides, in order that they may be overlapped and produce a joint of the thickness of the flange. Preferably enough material is removed to disclose the unsized body of the strip. Between its ends the flange is provided on one side with grooves or scores 5, in this instance four in number, and spaced to correspond with the corners of the box to be formed. The flange thus consists of a flexible strip having a central section 6, two intermediate sections 7, 7, arranged on opposite sides of its central section, and two end sections 8, 8 arranged at the extremities of the flange. The scores or grooves 5 are arranged between the central and the intermediate sections and between the intermediate and the end sections respectively, and preferably have angularly arranged walls and are of substantial depth, as shown in Fig. 11, in order to receive the folds of the binder, as hereinafter explained.

The grooves or scores 5 are preferably formed by removing the material of the flange to a suitable depth and by any suitable means, such for instance as the device for the purpose described in application for Patent Serial No. 492,029, hereinbefore referred to. By forming the groove in this manner the flat outer surface of the flange is preserved, resulting in a square corner when the flange is folded.

The scarfed ends of the flange are provided with an adhesive in order to fasten them together, and while any suitable adhesive may be used and may be applied in any manner desired, it is preferred to apply glue on each scarfed surface before they are lapped to form the joint. On the scarfed surface which faces outwardly in the finished box, glue is applied and allowed to become dry, or nearly so. The other scarfed surface, the one which faces inwardly in the finished box, is provided with glue which is allowed to become partly dried or tacky. In this manner the glue on the outwardly facing scarf operates as a sizing therefor and causes the same to become firmly united with the other scarf of the flange strip which is still sufficiently moist or tacky to permit of forming a reliable joint between the scarfed ends.

The binder or covering 3 consists of a strip which is applied lengthwise to the side of the flange strip opposite the grooves or scores and turned at one edge inwardly over one edge of the flange strip and against the inner side of the same, while the other edge of the strip extends beyond the corresponding edge of the flange strip. The flange strip with the binder attached thereto is shown in Fig. 2, the extended portion of the binder being adapted to be folded against the outer side of the bottom of the box. The binder may be of the same length as the flange, but for certain kinds of boxes this is not desirable, and it is preferred to make the binder of less length than the flange so as to leave the scarf joint between the ends of the flange uncovered by the binder, as shown in Fig. 5.

It is obvious that the flange and the binder may be made of any suitable thickness, but the preferred construction embodies a binder of thinner material than the flange, in order that it may readily adapt itself to the contours of the latter.

Many different forms of boxes may be made involving the elements of the invention, but the preferred shape is a square or oblong box having angular corners and flat faces or sides. Accordingly the head or body 1 of the box comprises a flat rectangular strip, the length of the sides of which correspond with the distance between the grooves 5 respectively, and the box is formed by placing the head on the flange, as shown in Fig. 3, the head abutting the flange and folding the flange with the binder around the edges of the head to inclose the head on all sides, as shown in Figs. 4 and 5. The beveled glued ends of the flange are overlapped, and are secured together by the glue or other suitable paste employed, and those portions of the binder extending beyond the edge of the flange are folded down against the outside of the head and pasted thereto, as illustrated in Figs. 6, 7 and 8. In its completed form the scorings or grooves of the flange are arranged on the inner sides of the corners of the box, and the sides of each groove are folded toward each other in bending the sections of the flange to form a corner, thereby causing the outer side of the corner to be sharp and square. In bending the sections of the flange to form the corners those portions of the folded upper edge of the binder on the inner side of the flange opposite the corners are deflected into the grooves or scores when bending the flange and binder around the head, thereby forming square, sharp or finished corners on the inner sides of the box, as shown in Figs. 9 and 11.

The method of producing the box will be generally apparent from the above description. The flange 2, while still in the form of a flat strip, is provided with the scores 5 and the scarfed portions 4. The binder 3 before being folded is provided over one surface with glue or other suitable adhesive and is applied to the unscored surface of the flange, so as to project therefrom on each side, and one projecting portion of the binder strip is now folded over and around the edge of the flange and down onto the scored side, as illustrated in Fig. 2. Glue having been applied to the scarfed ends of the flange strip, as previously explained, and the head having been positioned on the central section 6, at the edge opposite the folded binder, the combined binder and flange is folded around the head, whereupon the scarfed ends will overlap and be secured together by the glue, and these portions of the binder facing the scores will fold into the scores and produce a sharp and square corner on the inside of the box. On account of the manner of producing the scores, viz., by removing the material, the outside corners of the box will fold into sharp and flat corners as well. The binder, or cover, strip will span the grooves or scores at the corners on the inside of the flange strip, the result being that there is little if any puckering of the binder at the corners, the space provided by the grooves permitting the binder, or cover, strip to be laid in a smooth, substantially unpuckered condition at the inside corners of the box. Furthermore, when the flange is folded or bent around the head, the corners of the head will enter the grooves or scores, this being permitted by the fact that the sides or walls of the grooves are spaced so as to receive the binder. The other projecting portion of the binder is then folded down on the bottom of the head 1; first the rear portions 9 are folded onto the head, then the side portions 10 and then the front portion 11, as shown in Figs. 6, 7 and 8. The binder being provided with glue the folded portions will adhere to the bottom 1, and the box will thus be complete.

By this method a box is produced which presents a neat appearance without irregularities. The overlapped scarfed portions of the flange result in a firm joint conforming to the contour of the flange and avoiding any bulge at the joint, the finished flange being of equal thickness throughout. The inside and outside of the box present sharp, well defined corners and plane sides, which not only contribute to its finished appearance but to the production of a box conforming to predetermined dimensions.

As many changes could be made in carrying out the above method, and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. The method of making box elements which comprises grooving a strip of material, superposing on the grooved side of said strip a second strip, folding the strips, and disposing a folded portion of one strip in the groove at the folded portion of the other.

2. The method of making box elements which comprises abrading a strip of material to provide grooves, superposing and attaching on the grooved face of said strip a second strip, simultaneously folding the strips at the grooved portions, and deflecting portions of one strip into the grooves at the folded portions of the other.

3. The method of making box elements which comprises abrading a strip of material to provide grooves, superposing and attaching on the grooved face of said strip a second strip, simultaneously folding the strips and causing the walls of the grooves to approach each other and leave a space in the grooves spanned by the fold of the second strip, whereby a substantially smooth fold of the second strip is provided at the folded portions of the box element.

4. The method of making box elements which comprises grooving a strip of material at points corresponding to the corners of the box element, superposing and attaching on the grooved face of said strip a second strip, folding the strips and causing the walls of the grooves to approach each other and leave a space in the grooves spanned by the second strip, whereby a substantially smooth fold of the second strip is provided at the corners of the box element.

5. The method of making box elements which comprises superposing strips of material, one of said strips being grooved on a side facing the other, folding these strips, and disposing a folded portion of one strip in the groove at the folded portion of the other.

6. The method of making box elements which comprises superposing and adhesively attaching strips of material, one of said strips being abraded to provide grooves on a side facing the other, simultaneously folding the strips and disposing a folded portion of one strip in the groove at the folded portions of the other.

7. The method of making boxes comprising superposing and adhesively attaching a flange strip and a binder strip, one of said strips being abraded to provide grooves on lines to become corners of the box and facing the other strip, simultaneously folding the strips around the head of the box and disposing the corners of the head and the folded portions of the binder strip in the grooves of the flange strip.

8. The method of making a box having a head and a flange around the head, comprising abrading the material of the flange to provide scores at those parts of the flange to become the corners of the box, folding the flange on the head and seating the corners of the head in the scores of the flange.

9. The herein-described method of making a rectangular box having a head, a flange around the head and a binder connecting the head and flange, consisting in providing the flange on its inner side with transverse corner scores, then securing the binder to the outer side of the flange so that the upper and lower longitudinal edges of the binder extend laterally beyond the upper and lower longitudinal edges of the flange, then folding the upper edge of the binder over the upper edge of the flange and against the inner side of the latter so as to extend across said scores, then placing the head with one edge against the central part of the flange, then folding the intermediate and end parts of the flange around the head, so that said scores of the flange are at the corners of the head and those parts of the binder which extend across said scores are folded inwardly into said scores and produce square or sharp inner corners on the box, and then securing the lower edges of the binder to the outer side of the head, substantially as set forth.

10. The method of making boxes which comprises removing from the flange strip sufficient material to form scores at those portions of the flange strip which are to become the corners of the box, providing the surfaces of the flange strip with moist gluing material at those portions to be joined, allowing the glue on one surface to dry or nearly so, folding the said strip to form the box flange with the covering material within the scores at the folded portions of the flange, and bringing the glued surfaces together to complete the flange.

In testimony whereof I affix my signature, in the presence of two witnesses.

CARLOS HOLLY.

Witnesses:
 GEORGE W. RILEY,
 L. C. PALMER.